No. 774,351. PATENTED NOV. 8, 1904.
O. J. COPPINS.
ATTACHMENT FOR SCREEN DOORS, &c.
APPLICATION FILED MAY 26, 1903.
NO MODEL.

Witnesses
T. C. Barry
J. W. Bardroff

Inventor
Otto J. Coppins
By W. T. Fitzgerald
Attorneys

No. 774,351.  
Patented November 8, 1904.

UNITED STATES PATENT OFFICE.

OTTO J. COPPINS, OF HOBART, INDIANA.

ATTACHMENT FOR SCREEN-DOORS, &c.

SPECIFICATION forming part of Letters Patent No. 774,351, dated November 8, 1904.

Application filed May 26, 1903. Serial No. 158,889. (No model.)

*To all whom it may concern:*

Be it known that I, OTTO J. COPPINS, a citizen of the United States, residing at Hobart, in the county of Lake and State of Indiana, have invented certain new and useful Improvements in Attachments for Screen-Doors, &c.; and I do hereby declare the following to be a full, clear, and exact description of the invention, such as will enable others skilled in the art to which it appertains to make and use the same.

My invention relates to certain new and useful improvements in screens for doors, windows, or the like; and it consists of certain novel features of construction and combination of parts, as will be hereinafter clearly set forth.

The prime object of my invention, among others, is to provide an attachment for the surface of a screen door or window which will permit a fly or other insect to escape from the inside to the outside thereof and which will tend to prevent a fly or other insect from entering through the screen from the outside, and with said objects in view I provide an attachment of peculiar formation disposed throughout the surface of the screen, as will be specifically pointed out in the following specification and illustrated in the accompanying drawings, which are made a part of this application, and in which—

Figure 1:
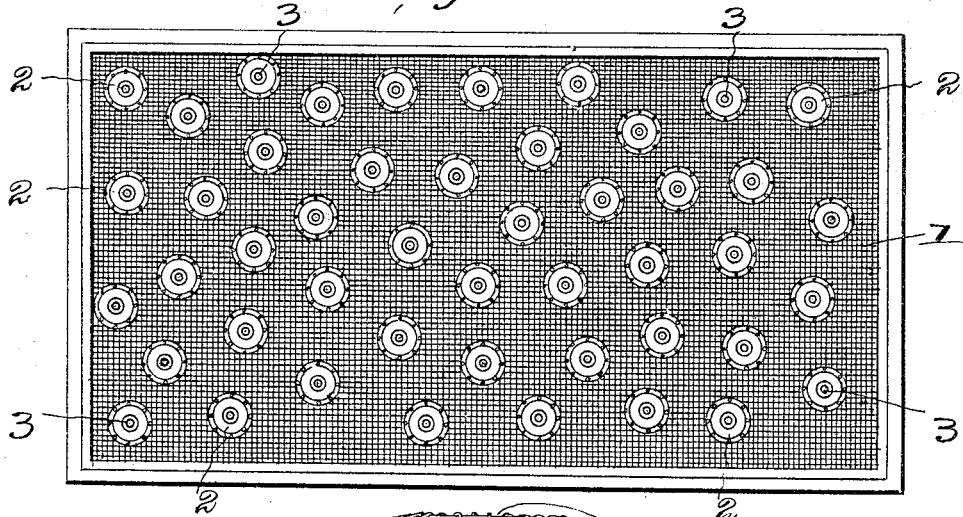
Figure 2:
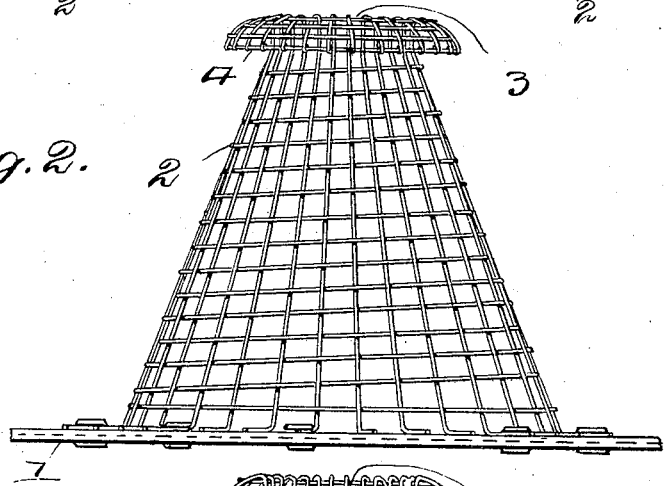
Figure 3:
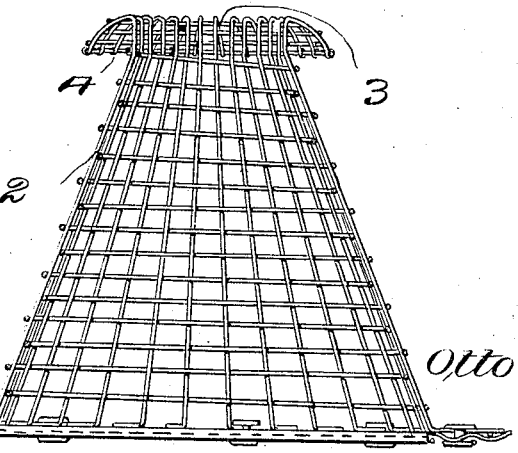

Figure 1 is a plan view of an ordinary screen for a door or window provided throughout its surface with a plurality of my improved attachments. Fig. 2 shows a side elevation of one of the attachments secured to a fragment of a screen, and Fig. 3 shows a central vertical sectional view through one of the attachments and a portion of the screen.

In order to conveniently refer to all of the parts of my invention and coöperating accessories, numerals will be employed, the same numeral applying to a corresponding part throughout the several views.

Referring to the numerals on the drawings, 1 shows the meshes of an ordinary screen-door, to which I attach a plurality of preferably conically-shaped hollow members 2, the base of each cone thus provided being disposed upon the screen proper and secured thereto by means of rivets, as shown, or by interweaving the free ends of the radial wires into the mesh of the body portion 1 in any preferred or well-known way, it being understood that a portion of the meshes 1 corresponding in size to the opening at the base of the cone have previously been removed. A fly or other insect in traveling over the inner surface of the screen will naturally enter the open end of the cone and seeing the opening 3 at the apex of the cone will seek the light entering through said opening and escape therethrough to the outer side of the screen.

I prefer to reduce the size of the openings 3 as much as possible, thus limiting the liability of an insect of entering through the openings into the room.

At the apex of each cone I provide a flange-like terminal 4, entirely surrounding the opening 3, thus limiting the probability of a fly or the like which may be traveling upward on the outer side of the cone of finding the open end thereof, inasmuch as said flange will deflect the course of the fly and limit its movement toward the extreme outer end of the cone. The terminal 4 is a continuation of the woven material from which the cone-shaped attachment 2 is formed, thus disposing a part of the wires radially around said opening 3, while the wires interwoven therewith are substantially concentric to said opening, thereby producing a strong and durable device and one which is pleasing in effect to the eye. The plane of the terminal 4, surrounding the opening 3, is substantially at right angles to the axis of the extension 2 and is concavo-convex in cross-section. By thus providing a flange of woven material the outer surface of which is convex the liability of garments or other objects catching thereon is practically eliminated.

It will be understood that the location of said conical extensions may be regular or irregular, as may be deemed to attain the best results, and it will also be understood that said members may be multiplied in number, as desired, and secured to the screen 1 in any preferred way, my object being to provide at certain intervals throughout the surface of the screen a plurality of light-admitting apertures designed to attract a fly or other insect upon the inside of the screen and cause it to make an exit through the apertures when seeking for light.

Having thus fully described my invention, what I claim as new, and desire to secure by Letters Patent, is—

A screen construction comprising the body portion having a plurality of extensions thereon, the extreme end of each extension being shaped to form a radial flange, said flange lying in a plane substantially at right angles to the axis of the extension proper and comprising a plurality of radially-disposed wires interwoven with wires substantially concentric with the opening in the outer end of the extension, said flange also being concavo-convex in general outline, as set forth.

In testimony whereof I affix my signature in presence of two witnesses.

OTTO J. COPPINS.

Witnesses:
GEORGE STOCKER,
J. O. CAVENDER.